United States Patent Office 3,816,470
Patented June 11, 1974

3,816,470
ORGANIC SALTS OF CHROMONE-CARBOXYLIC-2 ACIDS
Pierre A. Tronche, Clermont-Ferrand, Puy-de-Dome, France, assignor to Ferlux, Cournon d' Auvergne, France
No Drawing. Application Nov. 21, 1969, Ser. No. 878,896, which is a continuation-in-part of application Ser. No. 780,223, Nov. 29, 1968, now abandoned. Divided and this application May 24, 1972, Ser. No. 256,614
Claims priority, application France, Dec. 19, 1968, 179,086
Int. Cl. C07d 7/34
U.S. Cl. 260—345.2                    4 Claims

ABSTRACT OF THE DISCLOSURE

Pharmaceutical compositions which comprise the organic salts and derivatives of chromone-carboxylic-2 acids having the following formula:

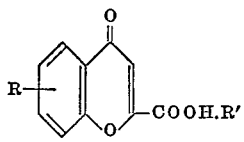

wherein R may be a hydrogen, a halogen or a hydroxyl or methoxy group and R' may be an organic base or more specifically a secondary amine.

---

This is a division of application Ser. No. 878,896, filed Nov. 21, 1969; said application Ser. No. 878,896 being a continuation-in-part of application Ser. No. 780,223, filed on Nov. 29, 1968, now abandoned.

This invention relates to new medicaments which in particular have high vitamin P activity and which comprise the organic salts of chromone-carboxylic-2 acids, which may or may not be substituted on the aromatic nucleus, and to which the following formula may be attributed:

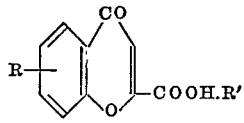

In this formula, R is a nuclear substituent, which may be hydrogen, a halogen, or a hydroxyl or methoxy group, and R' may be an organic base and more specifically a secondary amine.

The present invention likewise extends to compounds and derivatives of the salts thus defined. It relates more particularly to diethylamine and piperidine chromone-carboxylates-2.

These salts can be prepared from the corresponding chromone-carboxylic-2 acids and from the corresponding organic bases. In the case of an unsubstituted acid, more specifically chromone-carboxylic-2 acid, the operation is carried out in the following manner:

To a vigorously agitated suspension of 27 g. of sodium methylate (0.5 mol) in 300 ml. of petroleum ether (B.P.=54–70°) there is added drop by drop over a period of 30 minutes a solution of 36 g. of diethyl oxalate (0.25 mol) and 30.6 g. of o-hydroxy-acetophenone (0.22 mol) in 100 ml. of petroleum ether.

After vigorously agitating for two hours at the temperature of the laboratory, the sodium derivative of ethyl o-benzoyl-pyruvate (M.P.=210–212° C.) is isolated. This product is hydrolysed at boiling point for three hours in a mixture of 80 ml. of hydrochloric acid and 400 ml. of acetic acid.

The acid is crystallised by cooling; an additional quantity is collected by concentration of the mother liquors. The crude acid is recrystallised from dioxane.

Total yield: 80%
M.P. (Maquenne block): 261° C.
Heywang (1): 252° d.
Zagorevskii (2): 251–252°
Schmutz (3): 256–263°
De Vries (4): 256–259°

Analysis.—Calculated (percent): C, 63.16; H, 3.16.
Found (percent): C, 63.21; H, 3.22.

(1) Heywang R., Kostanecki J. V.: Ber., 35, 2887, 1902.
(2) Zagorevskii V. A., Zykov D. A., Vinokurov V. G.: J. Gen. Chem. U.S.S.R., 29, 1004, 1959.
(3) Schmutz J., Lauener H., Hirt R., Sanz M.: Helv. Chim. Acta. 34, 767, 1951.
(4) De Vries J. X., Heretervide K. V.: Nature, 191, No. 4784, 171, 1961.

In the case of chromone-carboxylic-2 acid containing a nuclear substituent, the procedure is similar to that described above, but the o-hydroxy-acetophenone is replaced by an equimolecular amount of the same product carrying the desired substituent at position 4 or 5.

It is thus possible to obtain for example:

Methoxy-7 chromone-carboxylic-2 acid
yield 75%, M.P. (Maquenne block)=245° C.
chloro-6 chromone-carboxylic-2 acid
yield 72%, M.P. (maquenne block)=268° C.

The invention will be better understood on reading the following description of several examples of performance of the invention.

EXAMPLE 1

Diethylamine chromone-carboxylate-2 is prepared: 190 g. (1 mol) of chromone-carboxylic-2 acid prepared in this manner and 73 g. of diethylamine are poured into 900 ml. of absolute alcohol. The mixture is heated for one hour with reflux, and cooled. The salt precipitates. It is recrystallised from a mixture of absolute alcohol and acetone, and a white micro-crystalline powder which is highly soluble in water is obtained. Its melting point is 138° C.

Analysis confirms that this is the diethylamine salt of chromone-carboxylic-2 acid.

Its solubility in water, the colourless character of the solution, and the high vitamin P activity of this compound as revealed by the trypan blue test make this salt as active a vitamin P factor as the anthocyanosides, more active than rutoside, and more suitable than those products for preparing liquid medicaments, particularly for application by injection.

The freedom from toxicity of this compound permits its clinical use on humans even for prolonged treatment. Its chemical stability enables it to be kept in solution and also to be associated with other active medical principles.

Diethylamine chromone-carboxylate-2 has remarkable properties from the point of view of an increase in capillary resistance and a reduction of capillary permeability.

Using the method of studying capillary permeability by the "Ambrose and de Eds" technique (Ambrose A. M. and de Eds F.: J. Pharmacol. Exp. Ther., 1947, 90, 359 and Fed. Proc., 1947, 6, 306), with various modifications it is possible to reveal very great activity in respect of capillary permeability.

This activity is general. It is manifested after oral or parenteral administration. Thus, after oral administration to albino rabbits of 40 mg./kg. of diethylamine chromone-carboxylate-2 in 2% aqueous solution of 1% gum tragacanth, the mean percentages of lengthening of the time of appearance of coloured spots in a batch of six animals were as follows:

| | |
|---|---|
| 88% | 101% |
| 109% | 108% |
| 98% | 94% |

Diethylamine chromone-carboxylate-2 has central analgesic properties revealed by the light beam test (test of Amour F. E., Smith D. L.: J. Pharmacol., 1941, 72, 74) when administered orally to mice in a dosage of from 400 to 800 mg./kg.

The same product also exhibits peripheral type analgesic properties when subjected to the hot plate test (test of Woolfe G., McDonald A. D.: J. Pharmacol., 1944, 80, 301). The doses administered orally to mice are: 850 mg./kg.

Diethylamine chromone-carboxylate-2 is slightly toxic. The $LD_{50}$ for mice is close to 800 mg./kg. when administered intravenously. In the case of oral administration it exceeds 5 g./kg.

In man diethylamine chromone-carboxylate-2 may be administered orally, parenterally, or it may be used for local therapeutic treatment.

EXAMPLE 2

Diethylamine chloro-6-chromone-carboxylate-2 is prepared similarly to Example 1, from the substituted acid and diethylamine, and a highly water soluble white microcrystalline powder having a melting point of 116° C. is obtained.

When subjected to the capillary permeability test by the Ambrose and de Eds technique (see Example 1), this salt exhibits a mean percentage of lengthening of the time of appearance of coloured spots of 80% when administered orally to albino rabbits with a dosage of 40 mg./kg.

EXAMPLE 3

Diethylamine methoxy - 7 - chromone-carboxylate-2 is prepared as in Example 1, but using methoxy-7-chromone-carboxylic-2 acid as starting product.

A white microcrystalline product which is highly soluble in water and has a melting point of 108° C. is obtained.

In mice the $LD_{50}$ determined by intraperitoneal administration exceeds 2 g./kg.

Vitamin P action determined on albino rabbits by the trypan blue test shows a percentage of lengthening of the time of appearance of coloured spots of from 110 to 130%.

EXAMPLE 4

The salts of chromone-carboxylic-2 acid and of the undermentioned amines can be prepared in the same manner as indicated above:

| | M.P., ° C. |
|---|---|
| Diethylamine | 170 |
| Dibutylamine | 145 |
| Phenylethylamine | 172 |
| Benzylamine | 182 |
| Morpholine | 142 |
| Piperidine | 148 |

All these salts possess vitamin P effects which can be objectified by the trypan blue test.

The lengthening of the time of appearance of coloured spots varies from 40 to 70%.

EXAMPLE 5

The diethylamine chromone-carboxylate-2 of Example 1 can be used in the form of tablets, which preferably have the following composition:

| For one tablet: | G. |
|---|---|
| Diethylamine chromone-carboxylate | 0.100 |
| Kieselguhr | 0.100 |
| Sugar | 0.040 |
| Talc | 0.015 |
| Starch | 0.015 |
| Magnesium stearate | 0.005 |

The daily doses used are in particular of the order of 400 mg., that is to say 4 tablets of the above composition for example.

EXAMPLE 6

Diethylamine methoxy-7-chromone-carboxylate-2 may be used in the form of tablets, which advantageously have the following composition:

| For one tablet: | G. |
|---|---|
| Diethylamine methoxy-7-chromone-carboxylate-2 | 0.100 |
| Kieselguhr | 0.100 |
| Sugar | 0.040 |
| Talc | 0.015 |
| Starch | 0.015 |
| Magnesium stearate | 0.005 |

The daily doses used are particularly of the order of 400 mg., that is to say for example 4 tablets having the above composition.

EXAMPLE 7

The diethylamine chromone-carboxylate-2 of Example 1 may also be used in the form of an injectable solute having the following composition:

| | G. |
|---|---|
| Diethylamine chromone-carboxylate | 5 |
| Sodium chloride | 0.7 |
| Distilled water quantity sufficient for 100 ml. | |

The daily doses are 5 ml. in subcutaneous or intramuscular injections, representing a dose of 250 mg. of active principle.

EXAMPLE 8

Diethylamine methoxy-7-chromone-carboxylate-2 may also be used in the form of an injectable solute having the following composition:

| | G. |
|---|---|
| Diethylamine methoxy-7-chromone-carboxylate-2 | 5 |
| Sodium chloride | 0.7 |
| Distilled water quantity to make 100 ml. | |

The daily doses are 5 ml. in subcutaneous or intramuscular injections, representing a dose of 250 mg. of active principle.

EXAMPLE 9

In local therapeutics use may be made of diethylamine methoxy-7-chromone-carboxylate-2 in the form of a collyrium, for example, having the following composition:

| | G. |
|---|---|
| Diethylamine methoxy-7-chromone-2-carboxylate | 1 |
| Boric acid | 0.40 |
| Sodium borate | 0.20 |
| Sodium chloride | 0.70 |
| Distilled water quantity to make 100 ml. | |

The collyrium may be instilled three or four times a day at the rate of two drops in the diseased eye.

These tablets, injectable solutes, and collyriums are used for the treatment of vascular diseases (circulatory insufficiencies), various diseases characterised by capillary hemorrhages, and painful syndromes.

EXAMPLE 10

A patient aged 70 suffers from extremely painful varicosity of the leg and thigh. The right leg is cold and slightly edematous; there is undoubtedly an arterial attack and the oscillometric index is low: 0.5 on the left, 1.5 on the right.

The treatment comprises administering to the patient two tablets according to Example 5 twice a day for 20 days.

Tolerance is excellent, the edema is resorbed, the varicose swellings are less painful and the pain is reduced. There is therefore a clear improvement of the phenomena of venous circulatory insufficiency.

EXAMPLE 11

A 65 year old patient has signs of diabetic arteritis. His walking range is reduced to 30 metres, the cramps are above all sharp and frequent at the level of the left calf. Pain at night is very severe, being of the type comprising burning pains on the sole of the foot, and frequently give rise to insomnia. The suctorial disc test carried out with a negative pressure of 30 cm. mercury for five minutes is found to be slightly positive at eight petechiae.

In conjunction with vasodilatory treatment, the patient receives a daily injection of injectable solute according to Example 7 for 20 days. Toleration of the medicine is very good; at the end of the treament the pain at night is less severe and the patient is able to sleep again. The suctorial disc test carried out again after the treatment was found to be negative.

EXAMPLE 12

A man of 63 years of age, hospitalised because of a dyspneic crisis accompanied by crises of asthma, suffers during the first few days of his hospitalisation from sub-conjunctival hemorrhage of the right eye.

For 30 days the patient is given every day four tablets according to Example 6 and also two instillations in the right eye of collyrium according to Example 9. Toleration of the medicine is excellent. The hemorrhage is rapidly resorbed and does not recur during the treatment and hospitalisation.

The invention further relates to amino salts, amides, hydrazides, and esters of such acids, and also to their compounds and derivatives to which the following general formula may be attributed:

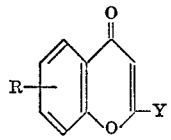

(I)

in which Y may represent the radical —COOH.R', in which R' may be the group:

in which $R_1$ and $R_2$, which are identical or different, may be hydrogen, an alkyl group, an aromatic cycle or a heterocycle, which may or may not themselves be substituted, or else the group:

may represent an optionally substituted hydroaromatic heterocycle, such as piperidine, morpholine; the group:

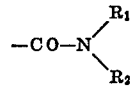

in which $R_1$ and $R_2$ are as stated above and the radical

may belong to an optionally substituted hydroaromatic heterocycle, such as piperidine, morpholine; the group —CO—NH—NHR$_3$ in which $R_3$ is a substituted or non-substituted aromatic core; or the group —COOR$_4$ in which $R_4$ is an alkyl group, a substituted or non-substituted aromatic cycle or heterocycle; and R may be a hydrogen atom, a halogen atom, a methoxy group, and in addition a hydroxyl group when Y is the group

CO—NH—NHR$_3$

The invention contemplates more particularly the chromone-carboxylates-2 of N-methylpiperazine, papaverine, cyclohexyl-amine, 2-aminopyridine, and also the N-phenyl, N-hydroxy-phenyl, N-pyridyl, N-sulphonamidophenyl, N-aminopyridyl, N-propylcyclohexyl, N-ethylcyclohexyl chromone-carbonamides-2, and also the phenylhydrazides of chromone-carboxylic-2 acid; the piperazinoethanol and salicylamide esters of chromone-carboxylic-2 acid.

The organic salts of chromone-carboxylic-2 acid (formula I in which Y=COOH.R') according to the invention have on the whole low toxicity, so that their use in human therapeutics is permissible even for prolonged treatment, and the vitamin P activity of these salts is always high. These two properties depend on the organic base used in the neutralisation of the acid, as indicated in Example 1.

The effects of the base are determined by measuring the LD$_{50}$ in the mouse by intraperitoneal administration (I.P.) and the lengthening of the time of appearance of coloured spots. The results are as follows:

| Base | LD$_{50}$ in mg./kg., I.P. administration (mouse) | Lengthening of time of appearance of coloured spots (percent) |
|---|---|---|
| Dimethylamine | >1,600 | 54 |
| Diethylamine | >1,600 | 80 |
| Dibutylamine | 200 | 75 |
| Morpholine | >1,600 | 45 |
| Phenylethylamine | 300 | 75 |
| Benzylamine | 600 | 50 |
| N-methylpiperazine | >1,600 | 92 |
| N-isopropylcyclohexylamine | 550 | 60 |
| 2-aminopyridine | 25 | 105 |
| Papaverine | 100 | 160 |

Substituted or non-substituted chromone-carboxylic-2 acid amides

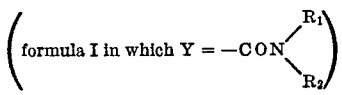

can be prepared by the action of the corresponding chromone-carboxylic-2 acid chloride on a primary or secondary amine or on a multifunctional molecule which includes a primary or secondary amine function. The operation is conducted in a homogeneous phase in a solvent, preferably dichloroethane or acetone; it may also be conducted in a mixed water-organic solvent phase when the nature of the amino compound requires this.

The amides or chromone-carboxylic-2 acid are compounds having low toxicity and possessing high vitamin P activity, as is clear from the following table:

| R | $R_1$ | $R_3$ | $LD_{50}$ in mg./kg., I.P. administration (mouse) | Lengthening of time of appearance of coloured spots percent |
|---|---|---|---|---|
| H | H | $-C_6H_4-COOH$ | 600 | 50 |
| H | N⟨S⟩ | $SO_2-C_6H_4-NH$ | 1,200 | 72 |
| H | H | $-CH_2-CH_2-CH_2-NH-\langle\rangle$ | 300 | 58 |
| H | $C_2H_5$ |  | 300 | 62 |
| H | H | (4)–$C_6H_3$⟨COOH (1), OH (2)⟩ | 600 | 86 |
| H | H | ⟨N⟩ | 150 | 114 |

The hydrazides of chromone-carboxylic-2-acids (formula I in which Y=—CONH—NHR₃) can be prepared by the action of the chloride of the corresponding chromone-carboxylic-2 acid on a substituted hydrazine in a solvent, which will preferably be acetone or dichloroethane.

The esters of the chromone-carboxylic-2 acids (formula I in which Y=—COOR₄) can be prepared by the action of the chloride of a chromone-carboxylic-2 acid on an alcohol, a phenol, or on a multifunctional molecule carrying either of these functions, in a solvent which will preferably be acetone or dichloroethane.

The esters are compounds having low toxicity and possessing high vitamin P activity, as will be seen from the following examples:

| R | $R_4$ | $LD_{50}$ in mg./kg., I.P. administration (mouse) | Lengthening of time of appearance of coloured spots, percent |
|---|---|---|---|
| H | $-CH_2-CH_2-N\langle\rangle NH$ | 1,200 | 70 |
| H | ⟨⟩CONH₂ | 1,200 | 57 |

The compounds may be used in the form of tablets, injectable solutes, collyriums, or other pharmaceutical preparations with a suitable medicinal dosage.

EXAMPLE 13

Preparation of N-p.hydroxyphenyl-chromone-carbonamide-2

A solution of 10.4 g. (0.05 mole) of chromone-carboxylic-2 acid chloride in 50 ml. of dichloroethane is added drop by drop, with agitation and cooling, to a mixture of 5.45 g. (0.05 mole) of p.aminophenol and 8.4 g. (0.1 mole) of monosodium carbonate in 50 ml. of ice water. When all has been added, agitation is continued for one hour. The precipitate is filtered and washed with a solution of monosodium carbonate, then with dilute hydrochloric acid, and finally with water.

It is re-crystallised from a mixture of water and dimethyl formamide, and 9.8 g. of N-p.hydroxyphenyl-chromone-carbonamide-2 are collected. (Yield 70%) M.P.: 275° C. $C_{16}H_{11}O_4N$, Mol. wt.: 281.28.

EXAMPLE 14

Preparation of N'-pyridine-2'-chromone-carbonamide-2

A solution of 4.8 g. (0.051 mole) of amino-2-pyrimidine in 25 ml. of dichloroethane is added drop by drop, with agitation and cooling, to a solution of 10.4 g. (0.05 mole) of chromone-carboxylic-2 acid chloride in 30 ml. of dichloroethane. When all has been added, agitation is maintained for one hour.

The precipitate is filtered and washed with a little water. It is re-crystallised from a 50:50 mixture of water and alcohol. 9 g. of N'-pyridine-2'-chromone-carbonamide-2 N-hydrochloride are collected. (Yield 60%) M.P.: 179° C. $C_{15}H_{11}O_3N_2Cl$, Mol. wt.: 302.5.

EXAMPLE 15

Preparation of N'-phenyl-chromone-carbohydrazide-2

A solution of 10.4 g. (0.05 mole) of chromone-carboxylic-2 acid chloride in 50 ml. of dichloroethane is added drop by drop with agitation and cooling to a solution of 5.4 g. (0.05 mole) of phenylhydrazine and 8.4 g. (0.1 mole) of sodium bicarbonate in 50 ml. of ice water.

When all has been added, agitation is maintained for about one hour. The precipitate is filtered, washed, and recrystallised from a mixture of water and dimethyl formamide.

9 g. of N'-phenylchlromone-carbohydrazide-2 are collected. (Yield 85%) M.P.: 221° C. $C_{16}H_{12}O_3N_2$, Mol. wt.: 280.

| $LD_{50}$ in mg./kg., I.P. administration—(mouse) | Lengthening of time of appearance of coloured spots (percent) |
|---|---|
| 450 | 60 |

The invention is naturally not limited to the examples described and illustrated; it is capable of numerous variations within the scope of those versed in the art, depending on the applications intended, and without thereby departing from the scope of the invention.

What I claim is:

1. A secondary amine salt of chromone-2-carboxylate wherein one substituent on the nitrogen atom of said secondary amine is a lower alkyl group having up to four carbon atoms and the other substituent is selected from the group consisting of phenyl groups, cyclohexyl groups and lower alkyl groups having up to four carbon atoms.

2. The salt of claim 1 wherein said secondary amine is diethylamine.

3. The salt of claim 1 wherein said secondary amine is dimethylamine.

4. The salt of claim 1 wherein said secondary amine is dibutylamine.

(References on following page)

References Cited

UNITED STATES PATENTS 3,484,445   12/1969   Lee et al.  _____ 260—345.2 X
3,652,765   3/1972   Ellis et al.  _____ 260—345.2

JOHN M. FORD, Primary Examiner

U.S. Cl. X.R.

424—283; 260—268 H, 290 HL, 295 F, 247.2 R, 295.58

UNITED STATES PATENT OFFICE
CERTIFICATE OF CORRECTION

Patent No. 3,816,470  Dated June 11, 1974

Inventor(s) Pierre A. Tronche

It is certified that error appears in the above-identified patent and that said Letters Patent are hereby corrected as shown below:

Column 6, line 57, "550" in the first column, should be --150--; line 59, "160" in the second column should be --120--.

Column 3, line 14, there should be a hyphen (-) at the end of the line after "an".

Signed and sealed this 1st day of October 1974.

(SEAL)
Attest:

McCOY M. GIBSON JR.
Attesting Officer

C. MARSHALL DANN
Commissioner of Patents